US011744244B2

(12) United States Patent
Alexander et al.

(10) Patent No.: US 11,744,244 B2
(45) Date of Patent: Sep. 5, 2023

(54) COMPOSITIONS AND METHODS FOR IMPROVING THE COMPATIBILITY OF WATER SOLUBLE HERBICIDE SALTS

(71) Applicants: CORTEVA AGRISCIENCE LLC, Indianapolis, IN (US); AKZO NOBEL CHEMICALS INTERNATIONAL B.V., Arnhem (NL)

(72) Inventors: Mark Alexander, Fort Worth, TX (US); Anne Austin, Signal Mountain, TN (US); Alex Kennedy, Indianapolis, IN (US); Lei Liu, Carmel, IN (US); Klin A. Rodrigues, Signal Mountain, TN (US); Holger Tank, Zionsville, IN (US)

(73) Assignees: CORTEVA AGRISCIENCE LLC, Indianapolis, IN (US); NOURYON CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/014,730

(22) Filed: Aug. 30, 2013

(65) Prior Publication Data

US 2014/0066304 A1 Mar. 6, 2014

Related U.S. Application Data

(60) Provisional application No. 61/739,364, filed on Dec. 19, 2012, provisional application No. 61/696,351, filed on Sep. 4, 2012.

(51) Int. Cl.

| | |
|---|---|
| ***A01N 25/00*** | (2006.01) |
| ***A01N 25/30*** | (2006.01) |
| ***A01N 39/04*** | (2006.01) |

(52) U.S. Cl.

CPC ............. *A01N 25/00* (2013.01); *A01N 25/30* (2013.01); *A01N 39/04* (2013.01)

(58) Field of Classification Search

CPC ........ A01N 25/00; A01N 25/30; A01N 39/04; A01N 25/22; A01N 39/02; A01N 43/40; A01N 57/20; A01N 59/02; A01N 2300/00; A01N 37/40

See application file for complete search history.

(56) References Cited

U.S. PATENT DOCUMENTS

| | | | | |
|---|---|---|---|---|
| 9,232,786 B2* | 1/2016 | Rodrigues | A01N 25/04 | |
| 9,526,241 B2* | 12/2016 | Rodrigues | A01N 25/04 | |
| 2005/0014649 A1* | 1/2005 | Hirohara | A01N 43/56 | 504/280 |
| 2005/0182219 A1* | 8/2005 | Meyer | C08F 265/00 | 526/264 |
| 2006/0270556 A1 | 11/2006 | Wright et al. | | |
| 2007/0191239 A1 | 8/2007 | Pompeo | | |
| 2009/0325808 A1 | 12/2009 | Stern et al. | | |
| 2010/0152048 A1* | 6/2010 | Rose | A01N 25/10 | 504/361 |
| 2010/0179198 A1 | 7/2010 | Mertoglu et al. | | |
| 2010/0197838 A1 | 8/2010 | Koehler et al. | | |
| 2011/0237439 A1 | 9/2011 | Tuerk et al. | | |
| 2012/0040827 A1 | 2/2012 | Klin et al. | | |
| 2012/0053056 A1 | 3/2012 | Liu et al. | | |
| 2015/0313212 A1* | 11/2015 | Alexander | C05G 3/02 | 504/144 |

FOREIGN PATENT DOCUMENTS

| | | | | |
|---|---|---|---|---|
| EP | 343142 A2 | 11/1989 | | |
| EP | 2908645 A1 | 8/2015 | | |
| JP | 20100532332 A | 6/2010 | | |
| JP | 2012519699 | 7/2010 | | |
| JP | 6596337 B2 | 10/2019 | | |
| WO | 00/38523 A1 | 7/2000 | | |
| WO | 2000059301 A1 | 10/2000 | | |
| WO | 2008036864 A2 | 3/2008 | | |
| WO | 2008061721 A2 | 5/2008 | | |
| WO | 2008069826 A1 | 6/2008 | | |
| WO | 2009007328 A1 | 1/2009 | | |
| WO | 2010121976 A2 | 10/2010 | | |
| WO | WO-2010121976 A2 * | 10/2010 | | A01N 25/04 |
| WO | WO-2012027349 A1 * | 3/2012 | | A01N 57/20 |
| WO | 2012027349 A1 | 3/2013 | | |
| WO | 2014/039379 A1 | 3/2014 | | |

OTHER PUBLICATIONS

International Searching Authority, International Search Report for PCT/US2015/057490 dated Jan. 29, 2014, all pages.

International Searching Authority, Written Opinion for PCT/US2015/057490 dated Jan. 29, 2014, all pages.

Kagaku-Daijiten (Encyclopedia Chimica) 8, compact edition, Kyoritsu Suppan Co. Ltd., all pages.

Japanese Office Action, Japanese Application No. 2015-530088, dated Dec. 5, 2017.

International Preliminary Reporton Patentability received for PCT Patent Application No. PCT/US2013/057490, dated Mar. 19, 2015, 8 pages.

* cited by examiner

*Primary Examiner* — Abigail Vanhorn

(74) *Attorney, Agent, or Firm* — Barnes & Thornburg LLP

(57) ABSTRACT

Methods and compositions for improving the compatibility of aqueous herbicide solutions containing at least one of a water soluble salt of an aryloxyalkanoic acid, a water soluble salt of a pyridyloxyalkanoic acid, and a water soluble salt of glyphosate, and optionally ≤16% of one or more fertilizers, such as ammonium sulfate, by adding certain polymeric crystallization inhibitors are provided.

25 Claims, No Drawings

COMPOSITIONS AND METHODS FOR IMPROVING THE COMPATIBILITY OF WATER SOLUBLE HERBICIDE SALTS

This application claims the benefit of U.S. Provisional Patent Application Ser. No. 61/696,351 (filed Sep. 4, 2012) and 61/739,364 (filed Dec. 19, 2013), the disclosures of which are expressly incorporated herein by reference.

BACKGROUND

Aqueous concentrate formulations of pesticidal and plant growth modifying chemicals are widely used in agricultural, industrial, recreational, and residential areas worldwide. The active ingredients of such concentrates frequently contain acid functional groups such as carboxylic or phosphonic acids, more commonly in the form of their water soluble salts. An aqueous concentrate is essentially a solution of an active ingredient in water at relatively high concentration, intended for dilution in water prior to application by spraying or other means. Typically an aqueous concentrate is diluted in about 10 to about 500 times its own volume of water prior to application.

In today's agrochemical market with the continued demand for improved productivity, it is increasingly common to combine more than one formulated product in a spray tank in order to achieve the optimal spectrum of control, efficacy, and delivery efficiency of the products. In doing this, however, spray tank incompatibilities between products can occur when components of a spray tank mixture or solution chemically or physically interact to cause an adverse effect on the stability, homogeneity, or other properties of the spray tank mixture that would reduce the effectiveness of the spray applied product. The incompatibility of a spray tank mixture or solution may physically manifest itself through the formation of crystalline precipitates, surface scum, oily droplets, gels, excessive foam or clumps of solid matter, and may result in clogged spray nozzles or screens.

Compatible aqueous pesticide mixtures or solutions are defined as those mixtures or solutions that, when formed by the combination or mixing of one or more pesticide products and/or other commonly used ingredients, result in a homogeneous liquid with little or no solids precipitation or phase separation and the retention of their full biological efficacy.

SUMMARY

A method of improving the compatibility of aqueous herbicide solutions containing at least one of a water soluble salt of an aryloxyalkanoic acid, a water soluble salt of a pyridyloxyalkanoic acid and a water soluble salt of glyphosate and optionally ≤16% of one or more fertilizers, includes adding to the aqueous herbicide solution one or more polymeric crystallization inhibitors of structure I $$-(A)_x-(B)_y-(C)_z- \qquad \text{I}$$

wherein A is

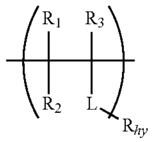

wherein $R_1$, $R_2$, and $R_3$ are independently H, $CH_3$, COOH, or $CH_2COOH$, L is a linking group comprising —C(═O)—O—, —C(═O)—N—, —$CH_2$—, —O—, —O—C(═O)—, or a direct bond, and $R_{hy}$ is hydrophobic and comprises a linear or branched alkyl, cycloalkyl, aryl, alkaryl or alkoxylated derivative thereof; B is derived from polymerizing an ethylenically unsaturated carboxylic acid monomer and/or it salts; and C is optional and is derived from polymerizing an ethylenically unsaturated sulfonic acid monomer or phosphonic acid monomer and/or its salts.

Further, an aqueous herbicide solution of improved compatibility including at least one of a water soluble salt of an aryloxyalkanoic acid, a water soluble salt of a pyridyloxyalkanoic acid, and a water soluble salt of glyphosate and optionally ≤16% of one or more fertilizers, and one or more polymeric crystallization inhibitors of structure I also is provided.

Additionally, a dry herbicide composition including a water soluble salt of 2,4-D and/r a water soluble salt of glyphosate, optionally ≤16% of one or more fertilizers, and one or more polymeric crystallization inhibitors of structure I also is provided.

DETAILED DESCRIPTION

Aqueous herbicide solutions containing at least one of a water soluble salt of an aryloxyalkanoic acid, a water soluble salt of a pyridyloxyalkanoic acid and a water soluble salt of glyphosate and optionally ≤16% of one or more fertilizers and methods of creating such solutions are provided. The aqueous herbicide solutions described herein have improved compatibility over previously known aqueous herbicide solutions including the listed components. The aqueous herbicide solutions as described herein contain a polymeric crystallization inhibitor that acts as a compatibilizing agent. The polymeric crystallization inhibitors are especially useful when inorganic or organo ammonium cations are present and provide compatibilization without the need to raise the pH of the solution.

It is known that aqueous solutions of water soluble salts of an aryloxyalkanoic acid such as salts of 2,4-D can have compatibility issues leading to the formation of precipitated solids under conditions where the acid equivalent (ae) concentration is about 0.3 weight percent or higher, the pH is about 6 or lower, and there is a sufficient concentration of inorganic cations such as, for example, $K^+$, $Na^+$, $Ca^{2+}$, $Mg^{2+}$, $NH_4^+$, $Fe^{2+}$, $Fe^{3+}$ and the like. The exact conditions necessary for the formation of precipitated solids from these solutions of 2,4-D salts will also depend on the temperature and hardness of the water used and the actual composition and concentrations of the components in the solution. For example, a spray tank mixture made from concentrates of DMA®-6 herbicide (Dow AgroSciences LLC, Indianapolis, Ind.; 2,4-D dimethyl ammonium salt solution with a pH value of about 7) at a rate of 800 g ae/hectare and Roundup WeatherMax® herbicide (Monsanto, St. Louis, Mo.; glyphosate potassium salt solution with a pH value of about 4.7) at 840 g ae/hectare and a spray volume of about 47 liters/hectare would have a pH value of about 5 and will be incompatible and result in the significant formation of solids.

The common practice of adding ammonium sulfate to aqueous herbicide spray mixtures containing glyphosate to improve herbicide performance may also lead to compatibility problems. For example, if a herbicide such as 2,4-D dimethyl ammonium (DMA) is present in a spray mixture containing glyphosate to which ammonium sulfate has been added, crystallization of solids can occur if the pH and the 2,4-D concentration are in the ranges described herein.

Methods for improving the compatibility of aqueous herbicide solutions containing at least one of a water soluble salt of an aryloxyalkanoic acid, a water soluble salt of a pyridyloxyalkanoic acid, and a water soluble salt of glyphosate and, optionally ≤16% of one or more fertilizers, including adding to the aqueous herbicide solution one or more polymeric crystallization inhibitors of Formula I are provided $$-(A)_x(B)_y(C)_z- \qquad \text{I}$$

wherein A is

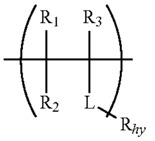

and $R_1$, $R_2$, and $R_3$ are independently H, $CH_3$, COOH, or $CH_2COOH$, L is a linking group comprising —C(═O)—O—, —C(═O)—N—, —$CH_2$—, —O—, —O—C(═O)—, or a direct bond, and $R_{hy}$ is hydrophobic and comprises a linear or branched alkyl, cycloalkyl, aryl, alkaryl or alkoxylated derivative thereof. $R_{hy}$ is preferably aromatic and is naphthalene, ethoxylated naphthalene, phenyl, ethoxylated phenyl, benzyl or ethoxylated benzyl. However, $R_{hy}$ can be aliphatic or alkoxylated aliphatic such as a linear or branched $C_1$ to $C_{22}$ group.

The polymeric crystallization inhibitors of Formula I are generally prepared by co-polymerizing two monomers including a monomer A and a monomer B, and optionally includes a monomer C, which provide parts A, B, and C as shown in Formula I. For purposes of this application, a monomer is defined as an ethylenenically unsaturated moiety that can be polymerized using free radical initiators. The polymeric crystallization inhibitor of Formula I will preferably have 5 to 80 mole % of A and 0 to 25 mole % of C with the rest being B. The polymeric crystallization inhibitor of Formula I will more preferably have 10 to 70 mole % of A and 2 to 20 mole % of C with the rest being B. The polymeric crystallization inhibitor of Formula I will most preferably have 15 to 50 mole % of A and 5 to 15 mole % of C with the rest being B. It is understood that the molar amounts of monomer A, B and C (if used) would add up to 100 percent.

The hydrophobic moiety, $R_{hy}$, can be incorporated into the polymeric crystallization inhibitors of Formula I by polymerizing one or more of the monomer A which may be selected from styrene, benzyl(meth)acrylate, phenyl(meth) acrylate, benzyl ethoxylate(meth)acrylate, phenyl ethoxylate(meth)acrylate, methyl methacrylate, methyl acrylate, 2-ethylhexyl acrylate, octyl acrylate, lauryl acrylate, stearyl acrylate, behenyl acrylate, 2-ethylhexyl methacrylate, octyl methacrylate, lauryl methacrylate, stearyl methacrylate, behenyl methacrylate, 2-ethylhexyl acrylamide, octyl acrylamide, lauryl acrylamide, stearyl acrylamide, behenyl acrylamide, propyl acrylate, butyl acrylate, pentyl acrylate, hexyl acrylate, vinyl acetate, 1-allyl naphthalene, 2-allyl naphthalene, 1-vinyl naphthalene styrene, α-methyl styrene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene and 2-vinyl naphthalene. Combinations of hydrophobic monomers may also be used in the polymerization to provide component A of Formula I.

Component B of Formula I is derived from polymerizing a monomer B which may be an ethylenically unsaturated carboxylic acid monomer and/or it salts. Useful ethylenically unsaturated carboxylated monomers for preparing the polymeric crystallization inhibitors of Formula I include but are not limited to acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, muconic acid, 2-acryloxypropionic acid, and maleic acid. Monomers such as maleic anhydride or acrylamide that can form a carboxylic acid moiety are also included. Combinations of ethylenically unsaturated carboxylated monomers can also be used. In one aspect, the ethylenically unsaturated carboxylic acid monomer is acrylic acid, maleic acid, or methacrylic acid. In another aspect the ethylenically unsaturated sulfonic acid monomer is 2-acrylamido-2-methyl propane sulfonic acid (AMPS).

Optional component C is derived from polymerizing a monomer C which may be an ethylenically unsaturated sulfonic acid monomer or phosphonic acid monomer and/or their salts. Examples of ethylenically unsaturated sulfonic acid monomers or phosphonic acid monomers (monomer C) and their salts include, but are not limited to, 2-acrylamido-2-methyl propane sulfonic acid (AMPS), 2-methacrylamido-2-methyl-1-propanesulphonic acid, 3-methacrylamido-2-hydroxy-propanesulphonic acid, allylsulphonic acid, methallylsulphonic acid, 2-hydroxy-3-(2-propenyloxy) propanesulphonic acid, 2-methyl-2-propene-1-sulphonic acid, 3-sulphopropyl acrylate, 3-sulphopropyl methacrylate, sulphomethylacrylamide, sulphomethylinethacrylamide, sodium styrene sulfonate, sodium 1-allyloxy 2 hydroxy propane sulfonate, allyloxybenzene sulfonic acid, vinyl sulfonic acid, sodium methallyl sulfonate, sulfonated styrene, allyloxybenzene sulfonic acid, vinyl phosphonic acid and others. When sodium styrene sulfonate is used as monomer C, then $R_{hy}$ is preferably aromatic or alkoxylated aromatic.

The polymeric crystallization inhibitors of Formula I may also include inorganic alkaline salts and organic amine salts as derivatives of the corresponding carboxylic, sulfonic and phosphonic acid groups attached to the polymer of Formula I. In certain cases such as, for example, in the case of improving the compatibility of aqueous solutions containing a water soluble 2,4-D salt, the organic amine salts of the corresponding carboxylic, sulfonic and phosphonic acid groups attached to the polymer of Formula I are useful. The organic amines in the form of their corresponding organo ammonium cations can be selected from, but are not limited to, monomethyl ammonium, isopropyl ammonium, butyl ammonium, dimethyl ammonium, diethyl ammonium, triethyl ammonium, monoethanol ammonium, diethanol ammonium, dimethylethyl ammonium, diethylethanol ammonium, triethanol ammonium, triisopropanol ammonium, tetramethyl ammonium, tetraethyl ammonium and N,N,N-trimethylethanol ammonium (choline), and cations made from dimethylaminopropylamine (DMAPA; N,N-dimethylpropane-1,3-diamine) and diethylenetriamine (DETA; bis(2-aminoethyl)amine), or mixtures thereof.

The polymeric crystallization inhibitors of Formula I can be prepared by processes known in the art such as those disclosed in U.S. Pat. No. 5,650,473 the relevant parts of which are incorporated herein by reference. The polymeric crystallization inhibitor of Formula I can be random, blocky, star shaped or any other architecture. The polymeric crystallization inhibitor of Formula I may have a weight average molecular weight from about 1,000 to about 20,000, and may include derivatives thereof such as, for example, the alkali metal salts such as the sodium carboxylates, the organo ammonium salts or sulfonated derivatives. Suitable polyacrylate co-polymers of Formula I include, for example, Alcosperse® 725, 725-D, 747 and 747-D, and Armak 2092 which are commercially available from Akzo Nobel Surface Chemistry LLC (Chicago, Ill.). Further examples of polymeric crystallization inhibitors of Formula I useful with the compositions and methods disclosed herein include co-polymers of benzyl methacrylate and acrylic acid (e.g., sample 5472e in Table 2) and co-polymers of styrene and acrylic acid (e.g., sample 5472g in Table 2).

Water soluble salts of aryloxyalkanoic acids as described herein include, for example, 2,4-D ((2,4-dichlorophenoxy) acetic acid), 2,4-DB, dichloroprop, mecoprop, MCPA, and MCPB. Pyridyloxyalkanoic acids as described herein include, for example, triclopyr and fluoroxypyr. The water soluble salts of the aryloxyalkanoic acids and the pyridyloxyalkanoic acids include those containing an organo ammonium cation such as, but not limited to, monomethyl ammonium, isopropyl ammonium, butyl ammonium, dimethyl ammonium, diethyl ammonium, triethyl ammonium, monoethanol ammonium, diethanol ammonium, dimethylethyl ammonium, diethylethanol ammonium, triethanol ammonium, triisopropanol ammonium, tetramethyl ammonium, tetraethyl ammonium and N,N,N-trimethylethanol ammonium (choline), and cations made from dimethylaminopropylamine (DMAPA; N,N-dimethylpropane-1,3-diamine) and diethylenetriamine (DETA; bis(2-aminoethyl) amine), or mixtures thereof. Aqueous solutions containing the water soluble salts of an aryloxyalkanoic acids and pyridyloxyalkanoic acids may include herbicidal spray solutions or herbicide concentrates.

The methods and compositions described herein for improving the compatibility of aqueous herbicide solutions may also be used with aqueous solutions containing water soluble salts of aryl- and/or heteroarylcarboxylic acid herbicides such as aminopyralid, clopyralid, dicamba, picloram, and the like.

Water soluble salts of glyphosate as described herein include those salts where the cation is selected from potassium, sodium and ammonium, also organo ammonium such as, for example, isopropyl ammonium, dimethyl ammonium, triethyl ammonium, monoethanol ammonium, diethanol ammonium, triethanol ammonium, choline and the like, and trimethylsulfonium cation and mixtures thereof.

The inorganic cations as described herein are those that when present in appreciable amounts or concentrations may cause aqueous solutions of the water soluble salts of an aryloxyalkanoic acid or a pyridyloxyalkanoic acid, optionally containing glyphosate, to become incompatible and form solids. These inorganic cations include, for example, alkali metal cations, such as sodium and potassium; alkaline earth metal cations, such as calcium and magnesium; transition metal cations, such as manganese, copper, zinc and iron; and ammonium. Aqueous solutions containing water soluble salts of 2,4-D and glyphosate at pH levels below about pH 6.5 tend to be more incompatible in the presence of appreciable concentrations of inorganic cations than are such solutions at higher pH levels.

The term appreciable concentration of inorganic cations as used herein refers to the concentration of inorganic cations present in an aqueous solution containing at least one of a water soluble salt of an aryloxyalkanoic acid, a water soluble salt of a pyridyloxyalkanoic acid, and a water soluble salt of glyphosate and optionally ≤16% of one or more fertilizers, that will lead to the precipitation of solids from that solution if all of the other conditions necessary for incompatibility of the solution exist, e.g., the composition and concentration of water soluble salts of an aryloxyalkanoic acid, water soluble salts of a pyridyloxyalkanoic acid, and/or water soluble salts of glyphosate, and the temperature, hardness and pH of the water. For example, a concentration of glyphosate potassium of about 0.8 weight percent (wt %) on an acid equivalent (ae) basis or higher in an aqueous solution at room temperature containing greater than about 0.8 wt % of 2,4-D DMA on an ae basis and made with water with a hardness of 342 parts per million (ppm) and a pH of about 5 will be incompatible. The compatibility of such a herbicide solution will depend, in addition to the other factors discussed herein, on the total concentration and actual composition of the inorganic cations present in the solution.

Ingredients that may contribute inorganic cations to the aqueous herbicide solutions described herein may include, but are not limited to, products or aqueous solutions containing fertilizers, micronutrients, hard water, co-formulation ingredients and the like, as well as, water soluble salts of glyphosate containing inorganic cations such as, for example, potassium, sodium, and ammonium.

Fertilizers are optionally included in the methods and compositions described herein and may be dispersed or dissolved in water and may contain inorganic cations such as, for example, ammonium and potassium, in sufficient amounts so as to cause incompatibility problems when mixed with an aqueous solution containing the water soluble salt of at least one of an aryloxyalkanoic acid, a pyridyloxyalkanoic acid, and glyphosate. The amount of fertilizer that may be optionally included in the methods and compositions described herein is less than or equal to 16 percent. Further examples of amounts of fertilizer that may be optionally included in the methods and compositions described herein include less than or equal to 15 percent, less than or equal to 14 percent, less than or equal to 13 percent, less than or equal to 12 percent, less than or equal to 11 percent, less than or equal to 10 percent, less than or equal to 9 percent, less than or equal to 8 percent, less than or equal to 7 percent, less than or equal to 6 percent, less than or equal to 5 percent, less than or equal to 4.5 percent, less than or equal to 4 percent, less than or equal to 3.5 percent, less than or equal to 3 percent, less than or equal to 2.5 percent, less than or equal to 2 percent, less than or equal to 1.5 percent, or less than or equal to 1 percent. Fertilizers may include, but are not limited to, ammonium sulfate (AMS), ammonium phosphate, ammonium nitrate, solutions of ammonium nitrate and urea which are commonly referred to in the art as 28% N or UAN, ammonium thiosulfate, potassium nitrate, potassium phosphate, potassium chloride, potassium carbonate and the like, and mixtures thereof. In addition to their fertilizer properties, AMS and UAN are commonly used as spray adjuvants or water conditioning agents with glyphosate herbicide treatments in order to improve biological efficacy. Thus, AMS is often mixed with glyphosate and the methods and compositions described herein can be used to improve compatibility when these solutions are combined with aqueous herbicide solutions containing a water soluble salt of an aryloxyalkanoic acid and/or a water soluble salt of a pyridyloxyalkanoic acid.

Micronutrients useful with the methods and compositions described herein may include one or more nutrients essential to plant growth and health that are only needed in very small quantities and may contain, among other things, one or more inorganic cations such as, for example, the cations of manganese, copper, iron, molybdenum and zinc. The micronutrients may be added to aqueous herbicide spray solutions containing water soluble salts of an aryloxyalkanoic acid, pyridyloxyalkanoic acid, and/or glyphosate for economical delivery to crop plants. Compatibility problems of these aqueous herbicide spray solutions may occur if the conditions for incompatibility of these solutions exist as described herein.

Organo ammonium cations that may cause incompatibility in the aqueous herbicide solutions described herein, particularly in concentrates and pre-mix concentrates, include monomethyl ammonium, isopropyl ammonium, butyl ammonium, dimethyl ammonium, diethyl ammonium, triethyl ammonium, monoethanol ammonium, diethanol ammonium, dimethylethyl ammonium, diethylethanol ammonium, triethanol ammonium, triisopropanol ammonium, tetramethyl ammonium, tetraethyl ammonium and N,N,N-trimethylethanol ammonium (choline), or mixtures thereof.

Co-formulation ingredients useful with the methods and compositions described herein include those products or ingredients that contain inorganic cations and may be selected from one or more of adjuvants, antifoam agents, antimicrobial agents, buffering agents, corrosion inhibitors, defoaming agents, deposition agents, dispersants, dyes, freezing point depressants, neutralizing agents, penetration aids, sequestering agents, spray drift control agents, spreading agents, stabilizers, sticking agents, suspension aids, viscosity-modifying additives, wetting agents and the like.

The polymeric crystallization inhibitors described herein may be used to improve the compatibility of aqueous herbicide solutions containing a water soluble salt of an aryloxyalkanoic acid, a water soluble salt of a pyridyloxyalkanoic acid, and/or a water soluble salt of glyphosate and optionally ≤16% of one or more fertilizers in spray tank mixtures, concentrates, or pre-mix concentrates. In aqueous spray tank mixtures, the polymeric crystallization inhibitor of Formula I may comprise, with respect to the aqueous herbicide spray solution of improved compatibility, from 0.01 to 5 weight percent, from 0.01 to 4 weight percent, from 0.01 to 3 weight percent, from 0.01 to 2 weight percent, from 0.01 to 1 weight percent, from 0.05 to 2 weight percent, from 0.05 to 1 weight percent, from 0.05 to 0.5 weight percent, from 0.1 to 0.4 weight percent, from 0.15 to 0.3 weight percent, or from 0.15 to 0.25 weight percent. In aqueous concentrates and aqueous pre-mix concentrates, the polymeric crystallization inhibitor of Formula I may comprise, with respect to the aqueous herbicide solution of improved compatibility, from 0.05 to 10 weight percent, from 0.05 to 8 weight percent, from 0.05 to 6 weight percent, from 0.1 to 5 weight percent, from 0.2 to 5 weight percent, from 0.3 to 5 weight percent, from 0.4 to 5 weight percent, from 0.5 to 5 weight percent, from 0.5 to 4 weight percent, from 0.5 to 3 weight percent, from 1 to 3 weight percent, or from 1.5 to 2.5 weight percent.

In some instances the polymeric crystallization inhibitors described herein can contain inorganic ions that could cause or add to the concentration of inorganic ions in a solution that cause incompatibility. In such cases, the polymeric crystallization inhibitor chosen should be be able to compatibilize the overall inorganic ion concentration after addition of the polymeric crystallization inhibitor. Alternatively, a polymeric crystallization inhibitor of Formula I that does not contain inorganic cations such as, for example, a polyacrylate co-polymer of Formula I where the carboxyl groups are in the acid or organo ammonium salt form can be used. Such polymeric crystallization inhibitors of Formula I that do not contain inorganic cations may be particularly useful for improving the storage stability of aqueous herbicide concentrates and pre-mix concentrates in ambient and sub-ambient temperature conditions.

Without intending to be bound by theory, the polymeric crystallization inhibitors described herein are believed to improve the compatibility of aqueous herbicide solutions comprised of at least one of a water soluble salt of an aryloxyalkanoic acid, a water soluble salt of a pyridyloxyalkanoic acid, and a water soluble salt of glyphosate, a suitable concentration of one or more inorganic cations, and a pH of less than about 6.5 by preventing or inhibiting the crystallization or precipitation of solids. The relative effectiveness of the polymeric crystallization inhibitors in preventing the formation of these solids can be estimated by measuring the on-set pH of crystallization (OSPOC) of the solids in a titration analysis procedure. The OSPOC of a particular composition can be measured by titrating a solution of an aryloxyalkanoic or pyridyloxyalkanoic acid salt of an inorganic cation such as, for example, the potassium salt of 2,4-D with a strong acid such as, for example, sulphuric acid until solids or crystals begin forming at a particular pH value (the OSPOC). The lower the OSPOC observed with the use of any particular polymeric crystallization inhibitor described herein, the better it may perform at preventing crystallization in, and therefore improving the compatibility of, an aqueous herbicide solution as described herein.

Alternatively, the relative effectiveness of the polymeric crystallization inhibitors described herein at improving the compatibility of the aqueous herbicide solutions described herein can be determined by measuring the Critical Crystallization Concentration (CCC) of the aryloxyalkanoic or pyridyloxyalkanoic acid salt of an inorganic cation such as, for example, the potassium salt of 2,4-D in a tank mix solution. The CCC of a particular composition can be measured by preparing saturated and over saturated solutions or mixtures of the composition and then measuring the concentration of the aryloxyalkanoic acid remaining in solution. The higher the CCC observed with the use of a particular polymeric crystallization inhibitor, the better it may perform at preventing crystallization in, and therefore improving the compatibility of, the aqueous herbicide solutions described herein.

The aqueous herbicide solutions described herein that may be compatibilized using the polymeric crystallization inhibitors described herein include concentrates, pre-mix concentrates, and spray solutions prepared by diluting such a concentrate or pre-mix concentrate, or by tank mixing multiple components of a spray solution. The aqueous herbicide concentrate or pre-mix concentrate may comprise the use of, with respect to the total composition, from 0.05 to 10 weight percent, from 0.05 to 8 weight percent, from 0.05 to 6 weight percent, from 0.1 to 5 weight percent, from 0.2 to 5 weight percent, from 0.3 to 5 weight percent, from 0.4 to 5 weight percent, from 0.5 to 5 weight percent, from 0.5 to 4 weight percent, from 0.5 to 3 weight percent, from 1 to 3 weight percent, or from 1.5 to 2.5 weight percent of one or more of the polymeric crystallization inhibitors described herein and from about 20 to about 60 weight percent on an acid equivalent basis of at least one of a water soluble salt of an aryloxyalkanoic acid (such as 2,4-D), a water soluble salt of a pyridyloxyalkanoic acid (such as triclopyr), and a water soluble salt of glyphosate, or a pre-mix containing one or more of these salts. The aqueous herbicide concentrate or pre-mix concentrate of improved compatibility is preferably a solution containing the polymeric crystallization inhibitor dissolved or dispersed in the concentrate which upon dilution in water with products or solutions and at conditions that are normally prone to cause incompatibility as described herein, forms a herbicide spray solution of improved compatibility. The herbicide spray solution of improved compatibility may also be prepared by tank mixing the individual components of the spray solution at the point of use. Such a spray solution may also be combined with or diluted with products or solutions and at conditions that are normally prone to cause incompatibility, as described herein, to form a herbicide spray solution of improved compatibility.

Use of the polymeric crystallization inhibitors as described herein in aqueous spray solutions containing soluble salts of 2,4-D, soluble salts of glyphosate, and inorganic cations provides solutions of improved compatibility at pH levels below about 6.5. Additionally, improved compatibility can be provided below about pH 5.5. Further, improved compatibility can be provided below about pH 5.

A compatible aqueous spray solution containing the water soluble salts of glyphosate and 2,4-D can be prepared by adding the aqueous soluble concentrates of the salts of glyphosate and 2,4-D to an aqueous solution containing the polymeric crystallization inhibitor of Formula I. Other co-formulation ingredients such as water soluble or water dispersible ingredients including, but not limited to, dispersing agents, wetting agents, spray drift reduction agents, fertilizers, and antifoam agents, may optionally be added to the spray solution.

An example of improving the compatibility of a spray solution at a pH below about 6.5 containing water soluble salts of glyphosate and 2,4-D, and inorganic cations using the methods described herein includes:

a) preparing a solution in water containing, with respect to the final spray solution, from about 0.01 to about 5 weight percent of a polymeric crystallization inhibitor of Formula I, such as, for example, Alcosperse® 725;
b) adding an aqueous concentrate of 2,4-D DMA to the solution prepared in a) to provide a solution comprising, with respect to the final spray solution, from about 0.3 to about 5 weight percent of 2,4-D on an acid equivalent (ae) basis;
c) adding an aqueous concentrate of Roundup WeatherMax® herbicide (an aqueous concentrate containing glyphosate potassium salt) (Monsanto; St. Louis, Mo.) to the solution prepared in b) to provide a solution comprising, with respect to the final spray solution, from about 0.3 to about 5 weight percent of glyphosate on an acid equivalent (ae) basis where the final pH is less than about 6.5;
d) adding an aqueous solution of ammonium sulfate (AMS) to the solution prepared in c) to give a solution comprising, with respect to the final spray solution, from about 1 to about 5 weight percent of AMS; and
e) optionally, adding other inert co-formulation ingredients to the solution prepared in d).

In a further example, a compatibilized aqueous herbicide spray solution may be prepared by diluting one or more aqueous herbicide concentrates or by tank mixing the components of the spray solution. Such a spray solution may comprise, with respect to the total spray solution, from 0.01 to 5 weight percent, from 0.05 to 2 weight percent, or from 0.05 to 0.5 weight percent of one or more polymeric crystallization inhibitors of Formula I, from 0.3 to 10 weight percent or from 0.3 to 5 weight percent each of a water soluble salt of 2,4-D, and a water soluble salt of glyphosate and optionally any additional ingredients such as fertilizer.

In a further example, a compatibilized aqueous herbicide concentrate can contain one or more polymeric crystallization inhibitors of Formula I and a water soluble salt of 2,4-D or glyphosate, or a pre-mix containing water soluble salts of 2,4-D and glyphosate. The concentrate may comprise, with respect to the total composition, from 0.05 to 10 weight percent, from 0.1 to 5 weight percent, or from 0.5 to 5 weight percent of one or more polymeric crystallization inhibitors, and from about 20 to about 60 weight percent on an acid equivalent basis of at least one of a water soluble salt of 2,4-D and a water soluble salt of glyphosate. As described herein, a compatibilized aqueous herbicide concentrate is a solution containing the polymeric crystallization inhibitor dissolved or dispersed in the concentrate which upon dilution in water with products or solutions and at conditions that are normally prone to cause incompatibility, also as described herein, forms a herbicide spray solution of improved compatibility.

In a typical method for preparing the compatible aqueous herbicide concentrate using the methods and compositions described herein, one or more polymeric crystallization inhibitors of Formula I, a water soluble salt of at least one of 2,4-D and glyphosate, and optionally, any additional ingredients, are mixed together in water to provide the aqueous concentrate. The order of addition of ingredients and the mixing conditions can be determined by one of ordinary skill in the art.

The methods and compositions described herein also include a dry herbicide composition including a water soluble salt of 2,4-D and/or a water soluble salt of glyphosate, optionally ≤16% of one or more fertilizers, and one or more polymeric crystallization inhibitors of structure I as described above. A dry herbicide composition can include from 0.05 to 10 weight percent, from 0.05 to 8 weight percent, from 0.05 to 6 weight percent, from 0.1 to 5 weight percent, from 0.2 to 5 weight percent, from 0.3 to 5 weight percent, from 0.4 to 5 weight percent, from 0.5 to 10 weight percent, from 0.5 to 5 weight percent, from 0.5 to 4 weight percent, from 0.5 to 3 weight percent, from 1 to 3 weight percent, or from 1.5 to 2.5 weight percent of one or more polymeric crystallization inhibitors of Formula I and from about 20 to about 80 weight percent on an acid equivalent basis of a water soluble salt of 2,4-D or a water soluble salt of glyphosate, or a mixture of water soluble salts of 2,4-D and glyphosate. Dry herbicide compositions as described herein form a herbicide spray solution of improved compatibility upon dissolution in water with products or solutions and at conditions that are normally prone to cause incompatibility as described herein.

In a typical method for preparing the dry herbicide composition, the one or more polymeric crystallization inhibitors, the water soluble salt of at least one of 2,4-D and glyphosate, and optionally, any additional ingredients, are mixed together in water to provide an aqueous concentrate. The order of addition of ingredients and the mixing conditions used can easily be determined by one of ordinary skill in the art. The aqueous concentrate may then be concentrated by removal of water and then dried to provide the dry herbicide composition which may also be prepared by dry blending the ingredients described herein. The dry composition can be added to an aqueous spray solution containing products or solutions and at conditions that are normally prone to cause incompatibility, as described herein, to form a herbicide spray solution of improved compatibility. It is commonly known that concentrated or dry formulations may be diluted or dissolved in water at from about 10 to about 500 fold dilution at the point of use depending on the agricultural practices.

The methods and compositions described herein can be used for the control of undesired plant growth. In such a use, a herbicidally effective amount of the aqueous spray solution of improved compatibility is applied to an area of soil or targeted plant foliage to kill or provide suitable control of undesirable weed plants.

The effective amount of the active ingredients used in the methods and compositions described herein to be employed in a typical agricultural application often depends upon, for example, the type of plants, the stage of growth of the plants, severity of environmental conditions, the weeds to be controlled and application conditions. Typically, a weed plant in need of control is contacted with an aqueous herbicidal spray solution that contains from about 0.01 to about 10 weight percent, preferably from about 0.1 to about 5 weight percent of a herbicide active ingredient on an acid equivalent basis with respect to the total aqueous spray solution. The contacting may be in any effective manner. For example, any exposed part of the plant, e.g., leaves or stems may be sprayed with the active ingredient as a solution in a carrier such as water.

The methods and compositions described herein are especially useful for the control of weeds in crops that are naturally tolerant to or have been made tolerant to or resistant to the herbicides contained in the spray solution by genetic manipulation or by mutation and selection. For example, corn, wheat, rice, soybean, sugar beet, cotton, canola, and other crops that have been made tolerant to or resistant to glyphosate and are naturally tolerant or resistant to or have been made genetically tolerant or resistant to 2,4-D can be treated. The aqueous herbicidal spray solutions of the present invention are also effective in controlling many weeds that have become resistant to glyphosate, for example, horseweed (*Conyza canadensis*, ERICA).

Optionally, the methods and compositions described herein may additionally contain one or more surfactants. The surfactants can be anionic, cationic, or nonionic in character. Typical surfactants include salts of alkyl sulfates, such as diethanolammonium lauryl sulfate; alkylarylsulfonate salts, such as calcium dodecylbenzenesulfonate; alkyl and/or arylalkylphenol-alkylene oxide addition products, such as nonylphenol-$C_{18}$ ethoxylate; alcohol-alkylene oxide addition products, such as tridecyl alcohol-$C_{16}$ ethoxylate; soaps, such as sodium stearate; alkylnaphthalenesulfonate salts, such as sodium dibutyl-naphthalenesulfonate; dialkyl esters of sulfosuccinate salts, such as sodium di(2-ethylhexyl) sulfosuccinate; sorbitol esters, such as sorbitol oleate; quaternary amines, such as lauryl trimethylammonium chloride; ethoxylated amines, such as tallowamine ethoxylated; betaine surfactants, such as cocoamidopropyl betaine; polyethylene glycol esters of fatty acids, such as polyethylene glycol stearate; block copolymers of ethylene oxide and propylene oxide; salts of mono and dialkyl phosphate esters; and mixtures thereof. The amounts and combinations of these surfactants to be used can easily be determined by one of ordinary skill in the art. As discussed above for polymeric crystallization inhibitors, it may be advantageous to avoid the use of surfactants that contain inorganic ions such as, for example, $Na^+$, $K^+$, or $NH_4^+$, at a level that will impact crystallization in order to maintain the intended physical stability of the compositions.

In addition to the specific methods and compositions set forth above, the methods and compositions described herein also may include compositions containing one or more additional compatible ingredients. These additional ingredients may include, for example, one or more pesticides or other ingredients, which may be dissolved or dispersed in the composition and may be selected from acaricides, algicides, antifeedants, avicides, bactericides, bird repellents, chemosterilants, defoliants, desiccants, disinfectants, fungicides, herbicide safeners, herbicides, insect attractants, insecticides, insect repellents, mammal repellents, mating disrupters, molluscicides, plant activators, modifiers of plant size and structure, rodenticides, semiochemicals, synergists and virucides. Also, any other additional ingredients providing functional utility such as, for example, antifoam agents, antimicrobial agents, buffers, corrosion inhibitors, dispersing agents, dyes, fragrants, freezing point depressants, neutralizing agents, odorants, penetration aids, sequestering agents, spray drift control agents, spreading agents, stabilizers, sticking agents, viscosity-modifying additives, and the like, may be included in these compositions.

The following Examples are presented to illustrate various aspects of the compositions and methods described herein and should not be construed as limitations to the claims.

Example 1 Reduction of the on-Set pH of Crystallization (OSPOC) of an Aqueous Solution of 2,4-D Potassium with Added Polymeric Crystallization Inhibitors (PCI) of Formula I The on-set pH of crystallization (OSPOC; the pH of the solution when crystallization begins) of a 100 mL sample of an aqueous solution of a 3 weight percent (acid equivalent basis) of 2,4-D potassium (2,4-D K) (prepared at Dow AgroSciences, LLC) with and without added Polymeric Crystallization Inhibitors (PCI) was determined as the pH was slowly lowered by the addition of 0.2 N aqueous sulfuric acid. As shown in Table 1, the addition of 0.2 weight percent of the PCI, with respect to total solution, to the aqueous solution of the 2,4-D K significantly reduced the OSPOC of the 2,4-D containing solutions when compared to the control example where no PCI was used. The PCIs used are described in Table 2.

TABLE 1

Inhibition of 2,4-D Potassium Salt Crystallization from Aqueous Solutions at Low pH With Polymeric Crystallization Inhibitors (PCIs) Shown in Table 2

| 2,4-D $K^+$ Concentration % AE w/w | PCI Used[1] | PCI Concentration, % w/w | On-Set pH of Crystallization |
|---|---|---|---|
| 3% | Control, 3% ae 2,4-D $K^+$, no PCI | 0.0% | 6.16 |
| 3% | Alcosperse ®725 | 0.2% | 4.79 |
| 3% | Alcosperse ®747 | 0.2% | 5.13 |
| 3% | Alcosperse ®725-D | 0.2% | 4.81 |
| 3% | Alcosperse ®747-D | 0.2% | 5.80 |
| 3% | Hydropalat ®44 | 0.2% | 5.79 |
| 3% | Hydropalat ®100 | 0.2% | 5.16 |
| 3% | Metasperse ™ 100L | 0.2% | 5.12 |
| 3% | Metasperse ™500L | 0.2% | 5.03 |
| 3% | 5312 | 0.2% | 5.88 |

TABLE 1-continued

Inhibition of 2,4-D Potassium Salt Crystallization from Aqueous Solutions at Low pH With Polymeric Crystallization Inhibitors (PCIs) Shown in Table 2

| 2,4-D $K^+$ Concentration % AE w/w | PCI Used[1] | PCI Concentration, % w/w | On-Set pH of Crystallization |
|---|---|---|---|
| 3% | 5416 | 0.2% | 5.17 |
| 3% | 3779 | 0.2% | 5.88 |
| 3% | 5072 | 0.2% | 5.15 |
| 3% | Armak 2092 | 0.2% | 5.09 |
| 3% | 5607a | 0.2% | 5.63 |
| 3% | 5607b | 0.2% | 5.46 |
| 3% | 5607c | 0.2% | 4.31 |
| 3% | 5472a | 0.2% | 5.08 |
| 3% | 5472b | 0.2% | 4.86 |
| 3% | 5472c | 0.2% | 4.78 |
| 3% | 5472d | 0.2% | 4.86 |
| 3% | 5798a | 0.2% | 5.61 |
| 3% | 5798b | 0.2% | 5.65 |
| 3% | 5798c | 0.2% | 5.59 |
| 3% | 5472e | 0.2% | 4.20 |
| 3% | 5472f | 0.2% | 4.15 |
| 3% | 5472g | 0.2% | 4.29 |

[1]Alcosperse ® products are available from Akzo Nobel Surface Chemistry LLC (Chicago, Illinois); Hydropalat ® products are available from Cognis (Cincinnati, OH), a division of BASF; and Metasperse ™ products are available from Croda (Edison, NJ).

TABLE 2

Description of Polymeric Crystallization Inhibitors (PCIs) Used in the Compositions and Methods Described Herein

| PCI ID | Polymer Description - Wt % of Monomers Used to Prepare Copolymers[1] of Experimental Samples |
|---|---|
| Alcosperse ®725 | Aqueous solution copolymer of acrylic acid and styrene available from AkzoNobel |
| Alcosperse ®747 EXP 6021 | Aqueous solution copolymer of acrylic acid and styrene available from AkzoNobel |
| Alcosperse ®725-D | spray dried copolymer of acrylic acid and styrene available from AkzoNobel |
| Alcosperse ®747-D | spray dried copolymer of acrylic acid and styrene available from AkzoNobel |
| Hydropalat ®44 | sodium polyacrylate |
| Hydropalat ®100 | ammonium polyacrylate copolymer |
| Metasperse ™100L | styrene-acrylic acid copolymer |
| Metasperse ™500L | styrene-acrylic acid copolymer |
| 5312 | 20% styrene + 40% itaconic acid + 40% sodium styrene sulfonate |
| 5416 | 34% styrene + 6% AMPS + 60% AA, Na salt |
| 3779 | 68% AA + 13% sodium methallyl sulfonate + 15.4% methylmethacrylate + 2.4% AMPS + 1.4% sulfophenyl methallyl ether |
| 5072 | 3.9% laurylmethacrylate + 96.1% AA |
| Armak 2092 | 25% BzMA + 10% AMPS + 65% AA, Na salt |
| 5607a | 30% AA + 70% styrene, Na salt |
| 5607b | 60% AA + 40% styrene, Na salt |
| 5607c | 70% AA + 30% styrene, Na salt |
| 5472a | 37.5% BzMA + 10% AMPS + 52.5% AA, Na salt |
| 5472b | 29% BzMA + 10% AMPS + 61% AA, Na salt |
| 5472c | 25% BzMA + 10% AMPS + 65% AA, Na salt |
| 5472d | 25% BzMA + 10% AMPS + 65% AA, Na salt |
| 5472e | 30% BzMA + 70% AA, DEA salt |
| 5472f | 20% BzMA + 80% AA, DEA salt |
| 5472g | 30% styrene + 70% AA, DEA salt |
| 5798a | 10% 2-EHA + 10% AMPS + 80% AA, Na salt |
| 5798b | 15% 2-EHA + 10% AMPS + 75% AA, Na salt |
| 5798c | 20% 2-EHA + 10% AMPS + 70% AA, Na salt |

[1]AA = acrylic acid; AMPS = 2-acrylamido-2-methylpropane sulfonic acid; BzMA = benzyl methacrylate; DEA = diethanolamine; Na = sodium; 2-EHA = 2-ethylhexyl acrylate.

Example 2 Determination of the Critical Crystallization Concentration (CCC) of 2,4-D in Aqueous Compositions Containing Salts of Glyphosate with Added Polymeric Crystallization Inhibitors (PCI)

The Critical Crystallization Concentration (CCC) of 2,4-D compositions were measured using two methods:

Method A: Spray mixtures were prepared containing 2,4-D (supplied by Dow AgroSciences, LLC), glyphosate (supplied by Dow AgroSciences, LLC), inorganic ions, and a polymeric crystallization inhibitor at various over-saturated 2,4-D concentrations where crystallizations were observed. The crystals formed in each mixture were isolated, dried, and weighed. The amount/weight of the crystals isolated from each mixture were plotted versus the 2,4-D wt % AE concentration in the mixture to provide a linear function. The CCC was determined by the X-intercept of the extrapolated linear function of the crystal weight vs. 2,4-D % AE concentration. For example, the following procedure was used to determine the CCC values exhibited in Table 3:

1. Appropriate amounts of water of 342 ppm hardness and 2,4-D aqueous concentrate formulation, e.g. choline salt, with or without built-in 2% w/w PCI were added to a 100 ml centrifuge tube and mixed until a homogeneous solution was achieved.
2. An appropriate amount of glyphosate aqueous concentrate formulation, e.g. the glyphosate K salt found in Roundup PowerMax® (Monsanto Company; St. Louis, Mo.), was added to the centrifuge tube and mixed by inversion.
3. Optionally, other tank mix ingredients such as ammonium sulfate (AMS) were added to the centrifuge tube.
4. 24 hours was allowed for equilibration of the sample at ambient temperature before filtering, collecting, drying and weighing the crystalline precipitates.
5. The amounts of 2,4-D and glyphosate salts were added to achieve desired AE concentrations of 2,4-D and glyphosate at 1:1 ratio, and the amount of water was calculated as a balance ingredient to achieve the final mixture volume of 100 ml.
6. Typically, a series of mixtures were prepared following the steps above at over-saturated concentrations, such as, 1.8%, 2.4%, and 3.0% on an acid equivalent (AE) basis of each herbicide salt. The weight of the crystal precipitates collected was plotted against the corresponding AE concentration of 2,4-D in the mixture. The critical crystallization concentration (CCC) can then be determined as the maximum % 2,4-D AE concentration before crystallization occurs by extrapolating the linear function of crystal precipitate weight vs. 2,4-D % AE concentration to the horizontal axis where crystal precipitate weight becomes zero.

TABLE 3

Determination of the Critical Crystallization Concentration (CCC) 2,4-D in Aqueous Compositions Containing Salts of 2,4-D and Glyphosate With Added Polymeric Crystallization Inhibitors (PCI) Using Method A

| 2,4-D Salt | Glyphosate Salt[1] | PCI ID | PCI conc. built-in concentrate, % w/w | 2,4-D CCC, % AE |
|---|---|---|---|---|
| 2,4-D choline | Roundup PowerMax ® | control sample, no PCI | 0.00% | 0.96% |
| 2,4-D choline | Roundup PowerMax ® | 5472e | 2.00% | 2.89% |
| 2,4-D choline | Roundup PowerMax ® | 5472g | 2.00% | 1.88% |

[1]Roundup PowerMax ® is an aqueous concentrate containing 540 g ae/L of glyphosate potassium salt (Monsanto Company, St. Louis, MO).

Method B: The CCC can also be determined by chemically analyzing the 2,4-D concentration in the clear supernatant portion of the over-saturated (crystallized) mixtures prepared by the procedure described in Method A by use of a standard HPLC method. This procedure was used to determine the CCC values shown in Table 4.

The higher the CCC observed with the use of a particular polymeric crystallization inhibitor as determined by Method A or Method B, the better it may perform at preventing crystallization in, and therefore improving the compatibility of, the aqueous herbicide solutions described herein. For example, as shown in Table 3, the inclusion of 2% PCI such as 5472e and 5472g in the 2,4-D choline concentrate formulation increased the CCC from 0.96% AE to 2.89% and 1.88%, respectively, which would result in a compatible tank mixture in much higher concentrations of 2,4-D and glyphosate salts than the one without the PCI.

TABLE 4

Determination of the Critical Crystallization Concentration (CCC) of 2,4-D in Aqueous Compositions Containing Salts of 2,4-D and Glyphosate With Added Polymeric Crystallization Inhibitors (PCI) Using Method B

| 2,4-D Salt[1] | Glyphosate Salt | PCI ID | PCI Conc. in mixing tank % w/w | AMS (ammonium sulfate) in mixing tank | 2,4-D CCC, % AE |
|---|---|---|---|---|---|
| 2,4-D choline | Roundup PowerMax ®[2] | control sample, no PCI | 0.00% | 0.00% | 1.11% |
| DMA ®-4 | Roundup PowerMax ® | control sample, no PCI | 0.00% | 0.00% | 1.04% |
| 2,4-D choline | Roundup PowerMax ® | 5472e | 0.20% | 0.00% | 2.41% |
| 2,4-D choline | Roundup PowerMax ® | 5472g | 0.20% | 0.00% | 2.06% |
| 2,4-D choline | Roundup PowerMax ® | control sample, no PCI | 0.00% | 2.00% | 0.90% |
| DMA ®-4 | Roundup PowerMax ® | control sample, no PCI | 0.00% | 2.00% | 0.88% |
| 2,4-D choline | Roundup PowerMax ® | 5472e | 0.20% | 2.00% | 1.61% |

TABLE 4-continued

Determination of the Critical Crystallization Concentration (CCC) of 2,4-D in Aqueous Compositions Containing Salts of 2,4-D and Glyphosate With Added Polymeric Crystallization Inhibitors (PCI) Using Method B

| 2,4-D Salt[1] | Glyphosate Salt | PCI ID | PCI Conc. in mixing tank % w/w | AMS (ammonium sulfate) in mixing tank | 2,4-D CCC, % AE |
|---|---|---|---|---|---|
| 2,4-D choline | Roundup PowerMax ® | 5472g | 0.20% | 2.00% | 1.53% |

[1]DMA ®-4 is an aqueous concentrate containing 456 g ae/L of 2,4-D dimethyl ammonium salt (Dow AgroSciences LLC, Indianapolis, IN);
[2]Roundup PowerMax ® is an aqueous concentrate containing 540 g ae/L of glyphosate potassium salt (Monsanto Company, St. Louis, MO).

Example 3 Preparation of a Compatible Aqueous Concentrate of 2,4-D Choline Salt Containing a Polymeric Crystallization Inhibitor (PCI) and Dilution of it in Spray Solutions Containing Glyphosate Salts and Ammonium Sulfate (AMS)

Preparation of 2,4-D Choline Concentrate: A 20 gram sample of a 2,4-D choline salt concentrate with a concentration of 456 grams acid equivalent per liter (g ae/L) of 2,4-D and containing 2% (w/w) of a PCI was prepared by mixing 7.7 g of 2,4-D acid technical (97% w/w) (supplied by Dow AgroSciences, LLC) with 0.80 g of a solution of PCI sample 5472e (50% in water) and 7.2 g of a choline hydroxide solution (45% choline hydroxide in water). Once the 2,4-D acid was completely dissolved, 0.66 g of a water solution of ethylenediaminetetraacetic acid mono-choline salt (25.4% in water) was mixed into the clear solution. An additional 1-1.4 g of the choline hydroxide solution were then added to adjust the pH of the concentrate to about 7.0 and water was added to provide a final sample weight of 20 g.

A typical procedure for preparing the spray solutions shown in Table 5 involved the following steps:

1. An appropriate amount of water of 342 ppm hardness was put into a 100 ml centrifuge tube, and then an appropriate amount of a 2,4-D aqueous concentrate formulation, e.g. 2,4-D choline salt, with or without built-in 2% (w/w) PCI was added, and the solution was mixed until a homogeneous solution is achieved.
2. An appropriate amount of glyphosate aqueous concentrate formulation, e.g. glyphosate K salt, was added to the centrifuge tube and mixed by inversion.
3. Optionally, other tank mix ingredients such as AMS were added to the centrifuge tube.
4. The amounts of 2,4-D and glyphosate salts were added to achieve the desired AE concentrations of 2,4-D and glyphosate at a 1:1 weight ratio, and the amount of water was calculated as a balance ingredient to achieve the final mixture volume of 100 ml. For example, 15 gal/ac, 10 gal/ac, and 5 gal/ac spray volumes for an 840 gae/ha use rate would be corresponding to about 0.6%, 0.9% and 1.8% AE of 2,4-D and glyphosate in the tank mixtures, respectively.
5. The spray solutions thus prepared were examined after 24 hours of equilibration at ambient temperature for the presence of any crystals or precipitates.

TABLE 5

Compatibility of Spray Solutions Prepared by Mixing a 456 g ae/L Aqueous Concentrate of 2,4-D Choline or Dimethyl Ammonium Salt Containing a Polymeric Crystallization Inhibitor (PCI) with a 540 g ae/L Aqueous Concentrate of Glyphosate Potassium Salt With or Without Added 2% AMS After 24 Hours At Room Temperature

| 2,4-D Salt[1] | Glyphosate Salt[2] | PCI ID | PCI Conc., in 2,4-D concentrate (% w/w) | AMS (ammonium sulfate) in mixing tank | Crystallization at Various Spray Volumes: 15 gal/ac | 10 gal/ac | 5 gal/ac |
|---|---|---|---|---|---|---|---|
| 2,4-D Choline | Roundup PowerMax ® | control sample, no PCI | 0.00% | 0.00% | No | Trace | Yes |
| DMA-4 | Roundup PowerMax ® | control sample, no PCI | 0.00% | 0.00% | No | Trace | Yes |
| 2,4-D Choline | Roundup PowerMax ® | 5472e | 2.00% | 0.00% | No | No | No |
| 2,4-D Choline | Roundup PowerMax ® | 5472g | 2.00% | 0.00% | No | No | Trace |
| 2,4-D Choline | Roundup PowerMax ® | control sample, no PCI | 0.00% | 2.00% | Yes | Yes | Yes |
| DMA-4 | Roundup PowerMax ® | control sample, no PCI | 0.00% | 2.00% | Yes | Yes | Yes |
| 2,4-D Choline | Roundup PowerMax ® | 5472e | 2.00% | 2.00% | No | No | Yes |
| 2,4-D Choline | Roundup PowerMax ® | 5472g | 2.00% | 2.00% | No | No | Yes |

[1]DMA ®-4 is an aqueous concentrate containing 456 g ae/L of 2,4-D dimethyl ammonium salt (Dow AgroSciences LLC, Indianapolis, IN).
[2]Roundup PowerMax ® is an aqueous concentrate containing 540 g ae/L of glyphosate potassium salt (Monsanto Company, St. Louis, MO).

The present invention is not limited in scope by the embodiments disclosed herein which are intended as illustrations of a few aspects of the invention and any embodiments which are functionally equivalent are within the scope of this invention. Various modifications of the processes, methods, and compositions in addition to those shown and described herein will become apparent to those skilled in the art and are intended to fall within the scope of the appended claims. Further, while only certain representative combinations of the process and method steps and composition components disclosed herein are specifically discussed in the embodiments above, other combinations of the composition components and process and method steps will become apparent to those skilled in the art and also are intended to fall within the scope of the appended claims. Thus a combination of components or steps may be explicitly mentioned herein; however, other combinations of components and steps are included, even though not explicitly stated. The term comprising and variations thereof as used herein is used synonymously with the term including and variations thereof and are open, non-limiting terms.

What is claimed:

1. A method of improving the compatibility of an aqueous herbicide solution including: an aqueous solution comprising a) (2,4-dicholorophenoxy)acetic acid; b) one or more inorganic cations selected from the group consisting of $Na^+$, $K^+$, $Ca^{2+}$, $Mg^{2+}$, $Fe^{2+}$, $Fe^{3+}$, $Mn^{2+}$, and $Zn^{2+}$ and/or one or more organo ammonium cations selected from the group consisting of monomethyl ammonium, isopropyl ammonium, butyl ammonium, dimethyl ammonium, diethyl ammonium, dimethylethyl ammonium, diethyethanol ammonium, triethanol ammonium, triisopropanol ammonium, tetramethyl ammonium, tetraethyl ammonium and N,N,N-trimethylethanol ammonium (choline), and cations made from dimethylaminopropylamine and diethylenetriamine, or mixtures thereof; c) less than 16% of ammonium sulfate; and b) glyphosate; comprising adding to the aqueous herbicide solution one or more polymeric crystallization inhibitors of structure I $$-(A)_x-(B)_y-(C)_z- \qquad \text{I}$$

wherein A is

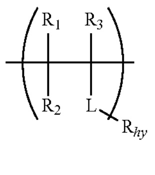

wherein $R_1$, $R_2$, and $R_3$ are independently H, $CH_3$, COOH, or $CH_2COOH$, L is a linking group comprising —C(=O)—O—, —$CH_2$—, —O—, —O—C(=O)—, or a direct bond, and $R_{hy}$ is hydrophobic and comprises a linear or branched alkyl, cycloalkyl, aryl, alkaryl or alkoxylated derivative thereof;

B is derived from polymerizing an ethylenically unsaturated carboxylic acid monomer and/or its salts; and C is 0 mole % of the polymeric crystallization inhibitor, wherein the (2,4-dicholorophenoxy)acetic acid is present in the aqueous solution at a concentration greater than 1% on an acid equivalent basis, and wherein the pH of the aqueous solution is about 6 or lower.

2. The method of claim 1, wherein $R_{hy}$ is a linear aryl moiety.

3. The method of claim 1, wherein $R_{hy}$ is naphthyl, ethoxylated naphthyl, phenyl, ethoxylated phenyl, benzyl, or ethoxylated benzyl.

4. The method of claim 1, wherein the aqueous herbicide solution is a concentrate or a pre-mix concentrate.

5. The method of claim 1, wherein the aqueous herbicide solution is a spray solution.

6. The method of claim 1, wherein the polymeric crystallization inhibitor is a co-polymer containing polyacrylate groups, polymethacrylate groups or polymaleate groups, or mixtures thereof.

7. The method of claim 6, wherein the co-polymer containing polyacrylate groups comprises hydrophobically modified groups derived from the polymerization of an acrylate monomer and a styrene or substituted styrene monomer.

8. The method of claim 1, wherein the polymeric crystallization inhibitor is in the form of a salt.

9. The method of claim 8, wherein the salt is an organic amine salt or an inorganic alkaline salt.

10. The method of claim 8, wherein the salt contains an organo ammonium cation selected from monomethyl ammonium, isopropyl ammonium, butyl ammonium, dimethyl ammonium, diethyl ammonium, triethyl ammonium, monoethanol ammonium, diethanol ammonium, dimethylethyl ammonium, diethylethanol ammonium, triethanol ammonium, triisopropanol ammonium, tetramethyl ammonium, tetraethyl ammonium and N,N,N-trimethylethanol ammonium (choline), and cations made from dimethylaminopropylamine and diethylenetriamine, or mixtures thereof.

11. The method of claim 1, wherein the polymeric crystallization inhibitor of structure I comprises 5 to 80 mole % of A and 0 mole % of C with the rest being B.

12. An aqueous herbicide solution of improved compatibility comprising: an aqueous solution comprising: a) (2,4-dicholorophenoxy)acetic acid; b) one or more inorganic cations selected from the group consisting of $Na^+$, $K^+$, $Ca^{2+}$, $Mg^{2+}$, $Fe^{2+}$, $Fe^{3+}$, $Cu^{2+}$, $Mn^{2+}$, and $Zn^{2+}$ and/or one or more organo ammonium cations selected from the group consisting of monomethyl ammonium, isopropyl ammonium, butyl ammonium, dimethyl ammonium, diethyl ammonium, dimethylethyl ammonium, diethyethanol ammonium, triethanol ammonium, triisopropanol ammonium, tetramethyl ammonium, tetraethyl ammonium and N,N,N-trimethylethanol ammonium (choline), and cations made from dimethylaminopropylamine and diethylenetriamine, or mixtures thereof; c) less than 16% ammonium sulfate; d) glyphosate; and f) one or more polymeric crystallization inhibitors of structure I $$-(A)_x-(B)_y-(C)_z- \quad \text{I}$$

wherein A is

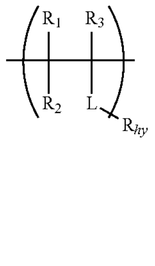

wherein $R_1$, $R_2$, and $R_3$ are independently H, $CH_3$, COOH, or $CH_2COOH$, L is a linking group comprising $-C(=O)-O-$, $-CH_2-$, $-O-$, $-O-C(=O)-$, or a direct bond, and $R_{hy}$ is hydrophobic and comprises a linear or branched alkyl, cycloalkyl, aryl, alkaryl or alkoxylated derivative thereof;

B is derived from polymerizing an ethylenically unsaturated carboxylic acid monomer and/or its salts; and C is 0 mole % of the polymeric crystallization inhibitor, wherein the (2,4-dicholorophenoxy)acetic acid is present in the aqueous solution at a concentration greater than 1% on an acid equivalent basis, and wherein the pH of the aqueous solution is about 6 or lower.

13. The aqueous herbicide solution of claim 12, wherein $R_{hy}$ is a linear aryl moiety.

14. The aqueous herbicide solution of claim 12, wherein $R_{hy}$ is naphthyl, ethoxylated naphthyl, phenyl, ethoxylated phenyl, benzyl, or ethoxylated benzyl.

15. The aqueous herbicide solution of claim 12, wherein the polymeric crystallization inhibitor is in the form of a salt.

16. The aqueous herbicide solution of claim 15, wherein the salt of the crystallization inhibitor is an organic amine salt or an inorganic alkaline salt.

17. The aqueous herbicide solution of claim 15, wherein the salt of the crystallization inhibitor contains an organo ammonium cation selected from monomethyl ammonium, isopropyl ammonium, butyl ammonium, dimethyl ammonium, diethyl ammonium, triethyl ammonium, monoethanol ammonium, diethanol ammonium, dimethylethyl ammonium, diethylethanol ammonium, triethanol ammonium, triisopropanol ammonium, tetramethyl ammonium, tetraethyl ammonium, N,N,N-trimethylethanol ammonium (choline), and cations made from dimethylaminopropylamine and diethylenetriamine, or mixtures thereof.

18. The aqueous herbicide solution of claim 12 that is a concentrate or a pre-mix concentrate.

19. The aqueous herbicide solution of claim 12 that is a spray solution.

20. The aqueous herbicide solution of claim 12, wherein the polymeric crystallization inhibitor is a co-polymer containing polyacrylate groups, polymethacrylate groups or polymaleate groups, or mixtures thereof.

21. The aqueous herbicide solution of claim 20, wherein the co-polymer containing polyacrylate groups comprises hydrophobically modified groups derived from the polymerization of an acrylate monomer and a styrene or substituted styrene monomer.

22. The aqueous herbicide solution of claim 12, wherein the polymeric crystallization inhibitor of structure I comprises 5 to 80 mole % of A and 0 mole % of C with the rest being B.

23. An aqueous herbicide solution of improved compatibility comprising: an aqueous solution comprising: a) (2,4-dicholorophenoxy)acetic acid; b) one or more inorganic cations selected from the group consisting of $Na^+$, $K^+$, $Ca^{2+}$, $Mg^{2+}$, $Fe^{2+}$, $Fe^{3+}$, $Cu^{2+}$, $Mn^{2+}$, and $Zn^{2+}$ and/or one or more organo ammonium cations selected from the group consisting of monomethyl ammonium, isopropyl ammonium, butyl ammonium, dimethyl ammonium, diethyl ammonium, dimethylethyl ammonium, diethyethanol ammonium, triethanol ammonium, triisopropanol ammonium, tetramethyl ammonium, tetraethyl ammonium and N,N,N-trimethylethanol ammonium (choline), and cations made from dimethylaminopropylamine and diethylenetriamine, or mixtures thereof; c) less than 16% ammonium sulfate; and d) one or more polymeric crystallization inhibitors of structure I $$-(A)_x-(B)_y-(C)_z- \quad \text{I}$$

wherein A is

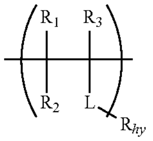

wherein $R_1$, $R_2$, and $R_3$ are independently H, $CH_3$, COOH, or $CH_2COOH$, L is a linking group comprising —C(═O)—O—, —CH2-, —O—, —O—C(═O)—, or a direct bond, and $R_{hy}$ is hydrophobic and comprises a linear or branched alkyl, cycloalkyl, aryl, alkaryl or alkoxylated derivative thereof;

B is derived from polymerizing an ethylenically unsaturated carboxylic acid monomer and/or its salts; and C is 0 mole % of the polymeric crystallization inhibitor, wherein the (2,4-dicholorophenoxy)acetic acid is present in the aqueous solution at a concentration greater than 1% on an acid equivalent basis, and wherein the pH of the aqueous solution is about 6 or lower.

24. A concentrated spray mixture, comprising, an aqueous solution of 0.2 weight percent of a dimethylammonium salt of a polymer, said polymer consisting of;

30 percent benzyl methacrylate, and 70 percent acrylic acid;

an aqueous concentrate of 2,4 D-dimethyl ammonium salt;

an aqueous concentrate of glyphosate potassium salt; and 2.00 weight percent of ammonium sulfate.

25. A spray mixture, comprising the concentrated spray mixture of claim 24, and additional water.

* * * * *